United States Patent [19]

Okazaki

[11] 4,097,700
[45] Jun. 27, 1978

[54] SWITCH MECHANISM FOR A TURN SIGNAL
[75] Inventor: Kunio Okazaki, Hatano, Japan
[73] Assignee: Stanley Electric Co., Ltd., Tokyo, Japan
[21] Appl. No.: 728,173
[22] Filed: Sep. 30, 1976
[30] Foreign Application Priority Data
  Nov. 14, 1975  Japan ........................ 50-154807[U]
[51] Int. Cl.² ................... H01H 3/16; H01H 9/00; B60Q 1/00
[52] U.S. Cl. ................... 200/61.27; 200/61.33; 335/173
[58] Field of Search ............... 200/12, 61.27, 61.3, 200/61.33, 61.38, 61.32, 153 K, 303; 335/164, 167, 173; 340/5 C

[56]  References Cited
  U.S. PATENT DOCUMENTS
  1,043,942  11/1912  Kimble ................................ 200/12
  1,902,700   3/1933  Hadano ........................ 200/61.27 X
  1,950,225   3/1934  Burton ................................ 335/173
  2,120,876   6/1938  Trautner ........................ 200/8 R X
  2,535,384  12/1950  Batt ................................ 200/61.38
  2,917,725  12/1959  Pearl ........................ 200/61.33 X
  2,924,680   2/1960  Swenson ........................ 200/12 X
  3,055,997   9/1962  Swenson ........................ 200/61.3
  3,175,056   3/1965  Swenson ........................ 200/61.3
  3,662,336   5/1972  Suzuki et al. ................. 200/61.27 X Primary Examiner—James R. Scott
Attorney, Agent, or Firm—Flynn & Frishauf

[57]  ABSTRACT

A switch mechanism for a turn signal having a transmitting means which is interposed between a stopper means for holding a moving contact piece to a position moved by an operating knob and means for releasing a holding force of the stopper means. The release means actuates the transmitting means which in turn operates on the stopper means to permit the turn signal to be reset to its initial inactive condition.

11 Claims, 12 Drawing Figures

U.S. Patent June 27, 1978 Sheet 1 of 3 4,097,700
FIG.1 PRIOR ART
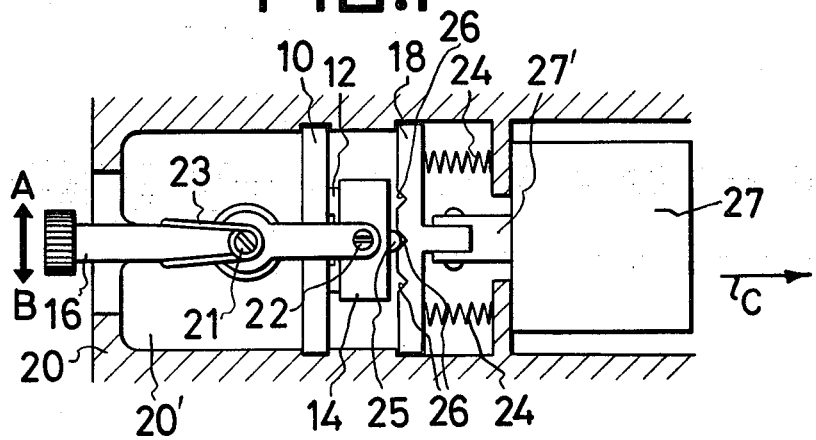
FIG.2 PRIOR ART
FIG.3 PRIOR ART
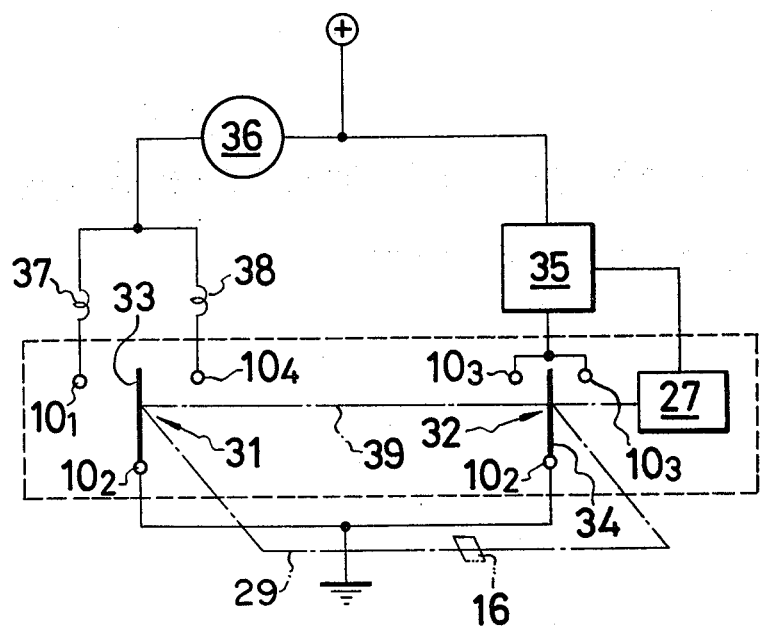

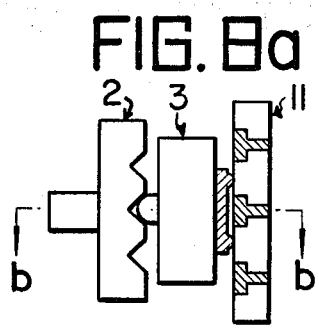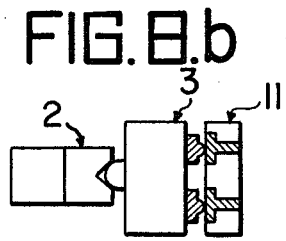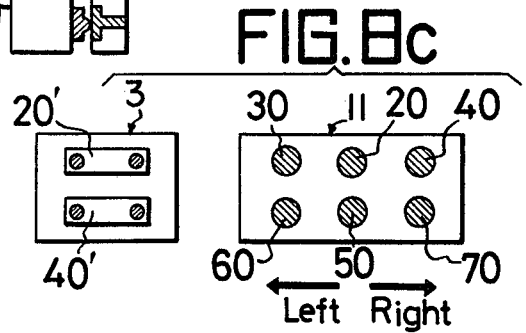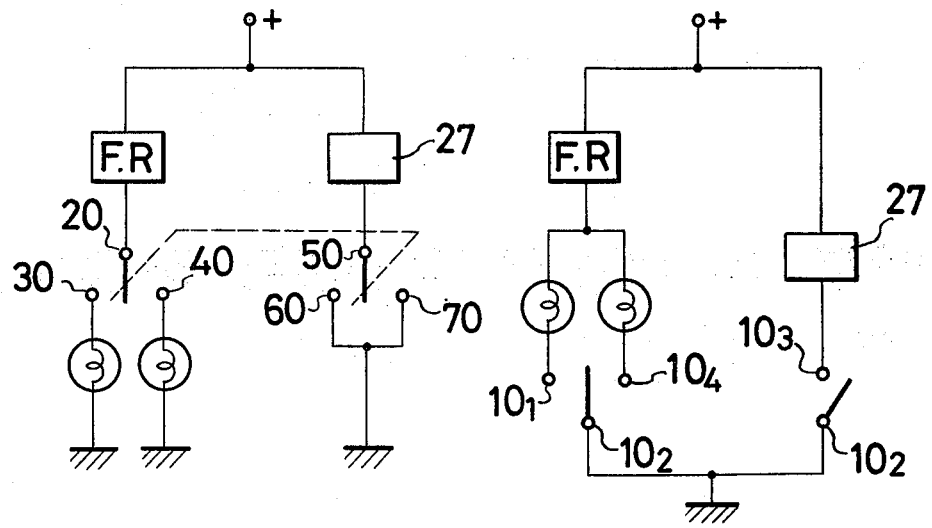

SWITCH MECHANISM FOR A TURN SIGNAL

BACKGROUND OF THE INVENTION

The present invention relates to a switch mechanism for a turn signal, and particularly to a switch mechanism for a turn signal which is suitable for use in two-wheeled vehicles and which is positively cancelled at a predetermined point.

In general, in switch mechanisms for a turn signal mounted on a two-wheeled vehicle, a driver manually operates an operating knob to permit a flasher lamp of the left or right side selectively to light. However, such a switch mechanism for a turn signal for a two-wheeled vehicle is different from that for a four-wheeled vehicle and the cancelling of the turn signal must be manually operated because it is not provided with a cancelling mechanism effected by operation of a handle. For this reason, when the driver forgets to cancel the flasher lamp, the latter continues to flash after the vehicle has completed a desired change of direction or a desired alteration of the vehicle advancing line whereby there exists a danger that drivers of vehicles passing near the vehicle may be misled.

A switch mechanism has been proposed to eliminate the above defects. However, such a switch is constituted to align important structural components, that is, an operating knob, stopper means for holding a moving contact piece, or the like. Therefore, in the switch mechanism having such a linear structure, its size is larger and it is undesirable and impractical to mount on two-wheeled vehicles.

OBJECT OF THE INVENTION

Accordingly, it is a general object of the present invention to provide a switch mechanism for a turn signal which can eliminate the above defects of the conventional device without harming the characteristics of the conventional switch mechanism.

It is another object of the invention to provide a switch mechanism for a turn signal which is adapted to be mounted on a two-wheeled vehicle and which is provided with transmitting means between stopper means and releasing means so as to avoid a linear arrangement of each component in the switch mechanism.

It is a further object of the invention to provide a turn signal switch for a two-wheeled vehicle which is compact in structure and which is high in practicality.

SUMMARY OF THe INVENTION

According to the present invention, there is provided a switch mechanism for a turn signal which comprises fixed contacts, at least one moving contact piece, an operating knob for moving the moving contact piece, stopper means for holding the moving contact piece at a position moved by the operating knob, bias means for applying a force to cause the operating knob to return to a desired position, release means for releasing the holding force of the stopper means at a predetermined point, and transmitting means interposed between the stopper means and the release means for releasing the holding force of the stopper means.

BRIEF DESCRIPTION OF THE DRAWINGS

These and other objects and advantages of the invention will become more apparent as the description proceeds, when considered with the accompanying drawings in which:

FIG. 1 is a transverse sectional view showing a conventional switch mechanism for a turn signal;

FIG. 2 is an enlarged sectional view showing essential parts of the switch mechanism in FIG. 1;

FIG. 3 is a circuit diagram of the circuit used in the switch mechanism shown in FIG. 1;

FIGS. 8(a)–8(c) are schematic views showing a structure of contact portions of the switch mechanism according to the invention;

FIG. 9 is a circuit diagram showing the structure illustrated in FIGS. 8(a)–8(c); and FIG. 10 is a circuit diagram of the conventional switch as shown in FIG. 3.

DETAILED DESCRIPTION OF THE INVENTION

Figure 4:
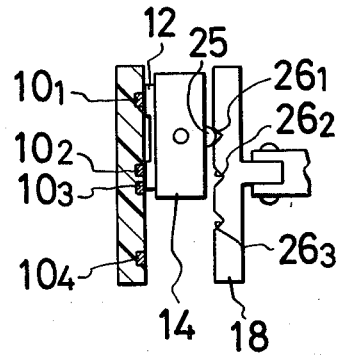
FIGS. 4 and 5 are cross-sectional views showing operating conditions of a moving contact piece of the switch mechanism shown in FIG. 1, respectively.
Figure 5:
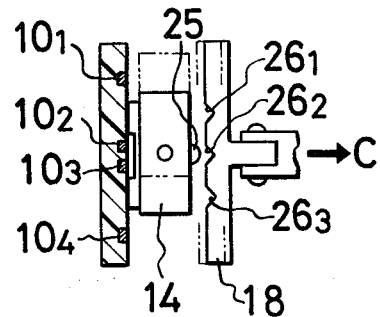

To better understand the present invention, one embodiment of the conventional switch mechanism will be described below with reference to FIGS. 1 to 5 of the drawings.

Referring first to FIG. 1, there is shown a conventional switch mechanism for a turn signal which includes a fixed member 10 in which fixed contacts are embedded and aligned in a certain relationship with each other, a moving member 14 on which a moving contact piece 12 is provided to complete an electrical connection between the fixed contacts, an operating knob 16 for moving the moving member 14, and a stopper 18 for holding the moving member 14 at a position moved by the operating knob 16 and for maintaining the electrical connection between the fixed contacts through the intermediary of the moving contact piece 12. In a space 20' of a housing 20 are accommodated the fixed member 10, the moving member 14, the operating knob 16 and the stopper means 18 together with other structural components.

The operting knob 16 is fixed in the housing 20. A portion of the knob 16 extends outwards of the housing through a hole formed in the housing 20 so as to facilitate operation of the operating knob 16, a generally central portion of which is pivotably secured by a in 21 in the housing and the leading end of which is pivotably secured similarly to the moving member 14 by a pin 22. Therefore, when the operating knob 16 is moved in the direction of arrow A or B the moving member 14 moves in the upper or lower direction in accordance with the movement of the operating knob 16. In this case, the operating knob 16 is always subject to a bias force exerted by a spring 23 to hold the operating knob 16 at a position shown in FIG. 1.

The stopper 18 is urged in the direction of the moving member 14 by a bias force exerted by springs 24 and is so constructed that the moving member 14 is held at the position moved by the operating knob 16 as mentioned above, by a cooperating action between a bearing 25 provided on the moving member 14 at the side opposite to the side on which the moving contact piece 12 is provided, and grooves 26 of the stopper 18. Accordingly, the bias force exerted by the spring 23 has only a force which does not move the moving member 14 against the bias force exerted by the springs 24.

The switch mechanism for a turn signal illustrated is provided with a device adapted to release at a predetermined point the force holding the moving member 14 by the stopper 18. In this embodiment, the release device is constructed by a solenoid which is actuated to pull the stopper 18 against the bias force exerted by the springs 24.

The switch mechanism for a turn signal described above includes, as shown in FIG. 2, fixed contacts $10_1$ – $10_4$ of the fixed member 10, a moving contact piece 12 of the moving member 14 and grooves $26_1$ – $26_3$ of the stopper 18, and is used by assembling in a circuit for a turn signal as shown by the dashed line in FIG. 3.

The electrical circuit shown in FIG. 3 is so constructed that when the moving contacts 33 and 34 of the two switches 31 and 32 which are operatively connected as shown by the chain line 29 are inclined, for example, to the left side in FIG. 3 and when the fixed contacts $10_1$ and $10_2$, and the fixed contacts $10_3$ and $10_2$ are electrically connected to each other, electric current is supplied from a + power supply to an electronic circuit 35 and a flasher unit 36 to initiate operation of the electronic circuit whereby the flasher lamp of the left side, for example, is flashed by the flasher unit 36. At this time, the moving contact piece 12 of the switch mechanism is moved upwards as shown in FIG. 4, and the fixed contacts $10_1$, $10_2$ and $10_3$ are electrically connected to each other and flashed as mentioned above. When the moving contact piece 12 moves upwards, the groove $26_1$ of the stopper 18 and the bearing 25 engage to maintain the moving contact piece 12 at its upper position. Further, reference numeral 38 shows a flasher lamp of the right side. The flasher lamp 38 is flashed through the intermediary of the flasher unit 36 when the moving contact piece 12 is moved downwards so that the groove 26 and the bearing 25 engage to be in their holding condition and that the fixed contacts $10_2$, $10_3$ and $10_4$ are in a live condition.

The electronic circuit 35 passes electric current from its output to the solenoid 27 at the point determined, for example, with respect to running distance or time thereby energizing the solenoid. When the solenoid 27 is energized, the stopper 18 is pulled back by a plunger 27' of the solenoid as shown by arrow C and releases the engagement between the bearing 25 of the moving member 14 and groove $26_1$ or $26_3$ to return the moving contact piece 12 at a position shown in FIGS. 1 and 2 if the contact piece 12 was held at its upper or lower position. In this case, when the moving member 14 is released from the stopper, it automatically returns to a neutral position at which the bearing 25 and the groove $26_2$ are engaged under the action of the spring 23.

As described above in detail, since the conventional switch for a turn signal has a structure which is adapted to linearly disposed its main components, that is, the operating knob 16, the stopper 18 and the like, the switch is long in size, is inconvenient for mounting on a two-wheeled vehicle, as previously mentioned, and is impractical.

The detailed description of the circuit used with the conventional mechanism and about the operating condition of the moving contact piece was given because the present invention relates to a switch mechanism itself and the switch can be used in the above described circuit in place of the conventional mechanism.

Figure 6:
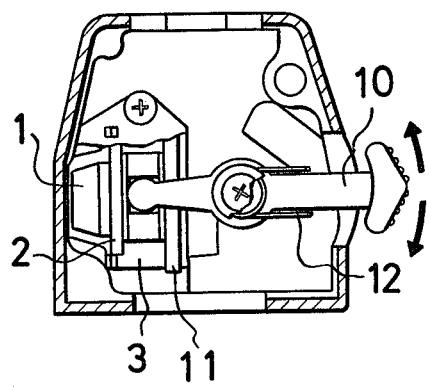
FIG. 6 is a plan view of the essential parts showing an embodiment of a switch mechanism for a turn signal according to the present invention.
Figure 7:
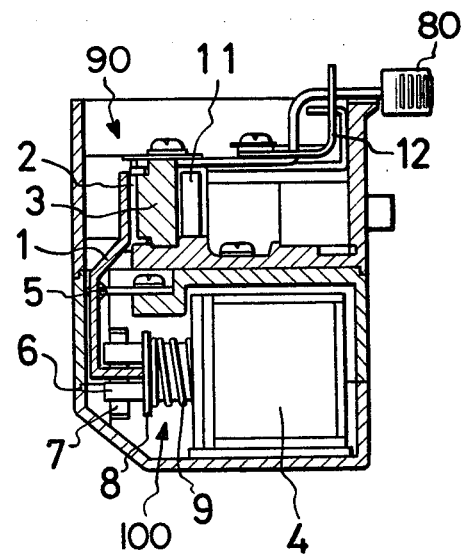
FIG. 7 is an essential side view of the switch mechanism shown in FIG. 6.

Referring next to FIGS. 6 and 7, there is shown one embodiment of a switch mechanism for a turn signal according to the present invention. As shown in FIG. 7, the switch mechanism has its housing 13 partitioned into an upper space 90 and a lower space 100. The upper space 90 accommodates stopper 2, an operating knob 80, or the like and the lower space 100 accommodates a device 4 adapted to release a force to hold a moving contact 3 caused by the stopper 2. A transmitting member 1 is interposed between the stopper 2 and the release device 4. The transmitting member 1 comprises a lever arm in this embodiment and is formed to be capable of pivoting at a pivot point 5 at its center. One end of the transmitting member 1 is mounted on the rear side of the stopper 2 and the other end is mounted by a pin 7 on a plunger 6 of a solenoid 4 which constitutes the release device 4. Reference numeral 8 shows a receiving piece mounted on one end of the side of the transmitting member 1 which is mounted on the plunger 6. Between the receiving piece 8 and the front side of the solenoid 4 is compressively provided a spring 9 encircling the plunger 6. Accordingly, the receiving piece 8 is subject to a bias force under the action of the spring 9, the bias force being transmitted to the stopper 2 through the intermediary of the transmitting member 1. That is, the bias force is given to the stopper 2 by the spring 9 so as to push the moving contact piece 3 which overcomes the bias force of the stopper 2 by the operating knob 30 and which is electrically connected by contacting with fixed contacts embedded in a fixed member 11, as in the conventional mechanism described above. In this connected condition, the moving contact piece 3, as previously described, is urged toward the stopper 2 and is held by press contacting to the fixed member. Further, reference numeral 12 shows a return spring for the operating knob 80.

The switch mechanism according to the invention constituted as described above is operable in the circuit shown in FIG. 3. The operation of the switch mechanism will be further described with reference to FIGS. 6 and 7.

The electrical circuit is so formed that when the operating knob 80 is moved downward as seen in FIG. 6 to connect the moving contact piece 3 with the fixed contact the turn signal of the left side is flashed and when the operating knob 80 is slid to the right the turn signal of the right side is flashed. Further, the circuit is adapted to actuate the solenoid 4 by passing current to the solenoid 4 at a predetermined point, that is, a point at which the flashing has become unnecessary (the point may be determined, for example, with respect to the manual putting back of the handle, the running distance, the running time or the like). When the solenoid 4 is actuated the plunger 6 pulls back against the spring 9 whereby the transmitting member 1 of a lever arm is pivoted about the pivot point 5 so as to release the urging force against the moving contact piece 3 caused by the stopper 2. Then, by the spring 12 mounted on the operating knob 80, the latter is returned to the neutral position shown in FIG. 6 while the moving contact piece 3 slides to release the electrical connection with the fixed contact of the fixed member 11. Accordingly, the current to the turn signal is cut off and the current to the solenoid is cut off. After the solenoid 4 is cut off, the transmitting member 1 and the plunger 6 are returned by the action of the spring 9.

Referring to FIGS. 8(a)–(c), there is shown a schematic structural view of the contact part employed in the switch mechanism shown in FIGS. 6 and 7. FIG. 8(a) is a side sectional view, and FIG. 8(b) is a sectional view taken along line b—b in FIG. 8(a). FIG. 8(c) is a front exploded view showing the contact part. As understood from the Figures, the fixed contacts are arranged in two rows and also the moving contacts are arranged in two rows. In this arrangement, when the mechanism is moved to the right side in FIG. 8(c) the contact 20' contacts with the contact 20, and also contacts with the contact 40. Further, at this time the contact 40' is connected with contacts 50 and 70.

As shown in FIG. 9, in the conventional two-wheeled car, one end of each lamp is grounded and a switch is interposed between the lamp and the flasher relay. Therefore, this switch can be replaced by the switch of the invention.

Referring to FIG. 10, there is shown a practical circuit for the conventional switch similar to FIG. 3. In this circuit, since the switch is interposed between the lamp and ground, it increases exchanges of wiring since the ground of the lamp must be cut off and since one end of the switch must be further grounded.

The switch mechanism for a turn signal according to the present invention, as mentioned above, has been developed for mounting on a two-wheeled car or vehicle by partitioning the switch mechanism into the upper and lower spaces 90 and 100, accommodating the release device 4 in the lower space to produce a compact structure and connecting the release device 4 with the structural components in the upper space through the intermediary of the transmitting member 1. The switch mechanism is sure in operation and is high in practicality.

While the preferred form of the present invention has been described, it is to be understood that modifications will be apparent to those skilled in the art without departing from the spirit and scope of the invention as defined in the appended claims.

What is claimed is:

1. A switch mechanism for a turn signal comprising: an operating knob (80) extending in a first direction, a housing divided into an upper space (90) and a lower space (100) by a partition extending at least partially thereacross, said upper and lower spaces extending one after the other at an angle relative to said first direction,
a first assembly in one of said spaces of said housing, said first assembly including:
a set of fixed contacts (11),
at least one movable contact piece (3),
said operating knob (80) being coupled to said movable contact piece (3) for moving said movable contact piece (3) and
stopper means (2) for holding said movable contact piece (3) at a position moved by said operating knob (80),
bias means (12) for applying a biasing force to said operating knob (80) to cause said operating knob (80) to return to a desired position,
release means (4) for generating a releasing force for releasing the holding force of said stopper means (2), said release means including a solenoid (4) having a movable plunger (6), and said release means being located in the other of said spaces of said housing and in side-by-side relationship with said first assembly, and
transmitting means (1) coupled between said stopper means (2) and said release means (4) for transmitting said releasing force to said stopper means (2), said transmitting means (1) including a lever arm (1), one end of which is mechanically coupled to a said stopper means (2) and the other end of which is mechanically coupled to said plunger (6) of said release means (4).

2. A switch mechanism according to claim 1, in which said lower space (90) of said housing accommodates said release means (4).

3. A switch mechanism according to claim 1 wherein said transmitting means has portions in both of said upper and lower spaces.

4. A switch mechanism according to claim 1 wherein said lever arm is pivoted at an intermediate portion thereof.

5. A switch mechanism according to claim 1 wherein said housing includes a partition between said upper and lower spaces, said transmitting means (1) passing through said partition and being pivoted in the vicinity of said partition.

6. A switch mechanism according to claim 1 wherein said plunger comprises a spring (9) biasing said plunger (6) and said other end of said transmitting means in a given direction; and said transmitting means (1) includes means coupled to said stopper means (2) for transmitting said biasing force to said stopper means (2) for holding said movable contact piece (3) at a position moved by said operating knob (80).

7. A switch mechanism according to claim 6 wherein said plunger (6) is moved by said solenoid (4) in a direction opposite to the biasing direction of said spring (9) upon actuation of said release means, said transmitting means thereby releasing the biasing force from said stopper means (2) to permit said movable contact piece (3) to move to a given rest position.

8. A switch mechanism according to claim 7 wherein said lever arm is pivoted at an intermediate portion thereof.

9. A switch mechanism according to claim 1 wherein said upper and lower spaces of said housing extend one after the other in a direction substantially perpendicular to said first direction.

10. A switch mechanism according to claim 9 wherein said housing comprises two separable members, one of said members delimiting said upper space and the other of said member delimiting said lower space.

11. A switch mechanism according to claim 1 wherein said housing comprises two separable members, one of said member delimiting said upper space and the other of said members delimiting said lower space.

* * * * *